(12) United States Patent
Yokobori

(10) Patent No.: US 7,694,705 B2
(45) Date of Patent: Apr. 13, 2010

(54) DRIFT TIRE AND REMOTE CONTROL CAR HAVING TIRE ATTACHED THERETO

(75) Inventor: Tomoaki Yokobori, Tokyo (JP)

(73) Assignee: Yokomo Ltd., Tokyo (JP)

( * ) Notice: Subject to any disclaimer, the term of this patent is extended or adjusted under 35 U.S.C. 154(b) by 243 days.

(21) Appl. No.: 10/961,747

(22) Filed: Oct. 8, 2004

(65) Prior Publication Data

US 2005/0145313 A1    Jul. 7, 2005

(30) Foreign Application Priority Data

Oct. 10, 2003   (JP)   ............... 2003-351928
Jul. 8, 2004    (JP)   ............... 2004-201452

(51) Int. Cl.
*B60C 1/00*    (2006.01)
*B60C 11/04*   (2006.01)

(52) U.S. Cl. ............... 152/176; 152/209.5; 301/5.308; 446/454; 446/465

(58) Field of Classification Search ............. 152/209.5, 152/176; 446/454–456, 465; 301/5.308
See application file for complete search history.

(56) References Cited

U.S. PATENT DOCUMENTS

| | | | | | |
|---|---|---|---|---|---|
| 285,836 | A | * | 10/1883 | Otis | ............... 301/5.304 |
| 1,664,352 | A | * | 3/1928 | Coleman | ............... 152/209.5 |
| 2,254,329 | A | * | 9/1941 | Stephens | ............... 152/176 |
| 3,607,497 | A | * | 9/1971 | Chrobak | ............... 156/117 |
| 3,899,013 | A | * | 8/1975 | Kruse | ............... 152/176 |
| 4,209,942 | A | * | 7/1980 | Lohr | ............... 446/454 |
| 4,683,928 | A | * | 8/1987 | Yahagi | ............... 152/209.5 |
| 4,699,432 | A | * | 10/1987 | Klamer | ............... 152/210 |
| 4,739,811 | A | * | 4/1988 | Rampl | ............... 152/209.5 |
| 4,819,704 | A | * | 4/1989 | Misawa et al. | ............... 152/209.1 |
| 5,722,873 | A | * | 3/1998 | Ishimoto | ............... 446/456 |
| 6,036,278 | A | * | 3/2000 | Boyer | ............... 301/5.309 |
| 6,374,886 | B1 | * | 4/2002 | Eromaki | ............... 152/210 |

FOREIGN PATENT DOCUMENTS

| | | | |
|---|---|---|---|
| AT | 136525 | * | 9/1933 |
| CA | 547958 | * | 10/1957 |
| DE | 1031192 | * | 5/1958 |
| GB | 129421 | * | 7/1919 |
| GB | 357419 | * | 9/1931 |
| GB | 506142 | * | 5/1939 |
| GB | 956011 | * | 4/1964 |
| GB | 2134049 | * | 8/1984 |
| GB | 2302039 | * | 1/1997 |
| GB | 2303591 | * | 2/1997 |
| JP | 07-039652 | | 2/1995 |
| JP | 2000-325671 | | 11/2000 |

\* cited by examiner

*Primary Examiner*—Steven D Maki
(74) *Attorney, Agent, or Firm*—Knobbe Martens Olson & Bear, LLP

(57) ABSTRACT

Both a "grip" run and a drift run of a remote control car are achieved by fitting rings to an outer peripheral surface of a tire or tires. In a drift tire, at least one annular groove is formed on an outer surface of an annular body of a tire main body in a circumferential direction, at least one ring made of a different material and/or shape from that of the annular body is fitted to the annular groove, and the ring is level with or protrudes from the outer surface of the annular body.

5 Claims, 10 Drawing Sheets

DRIFT TIRE AND REMOTE CONTROL CAR HAVING TIRE ATTACHED THERETO

BACKGROUND OF THE INVENTION

1. Field of the Invention

The present invention relates generally to a remote control car represented by a radio control car, and more particularly to a drift tire by which a drift run can be easily achieved, and a remote control car to which the tire is attached.

2. Description of the Related Art

In general, the run of a remote control car is mainly constituted by a "grip" run, and a main object of the remote control car is to stably run and compete in speed. Accordingly, in the tire used in the remote control car, in order to improve traction (a grip force) with various road surfaces, concavity and convexity having various shapes are formed on an outer surface of the tire, or a material likely to grip is selected (for example, Japanese Patent Laid-open No. 7-39652).

As mentioned above, the tire in the conventional remote control car is provided for achieving the grip run, and a technical development has been focused on improvement on a grip state with respect to a road surface. There is no technical development undertaken for a tire expected to perform a drift run.

In order to achieve the drift run, a manipulator controls and changes an angle of the tire in a slipping direction; however, since the tire itself is structured so as to achieve the grip run as mentioned above, and a frictional force with respect to the road surface is applied, the drift run intended by the manipulator can not be achieved, and in some cases, a vehicle has a fall. Therefore, the tire surface is designed to be made slippery with respect to the road surface by putting a smooth synthetic resin pipe on an outer peripheral surface of the tire or by winding tapes around the outer peripheral surface of the tire. However, in the case of the pipe, it is hard to attach the pipe, and in the case of the tapes, the tapes frequently drop out more easily than the tire. Further, in order to make the running road surface itself slippery, the road surface is designed to be formed by a P-tile or be coated with a wax; however, there is a problem in that the road surface must be specifically constituted.

SUMMARY OF THE INVENTION

In an aspect, the present invention provides a tire which is used for enjoying a drift run in place of mainly enjoying the grip run mentioned above. In another aspect, the present invention provides a drift tire which enables the drift run in addition to the normal run by attaching the tire to front wheels and rear wheels of a remote control car or other vehicles or only to the rear wheels. In yet another aspect, the present invention provides a remote control car to which the tire is attached.

Specifically, in accordance with an aspect of the present invention, there is provided a drift tire comprising:

a tire main body having an annular body having at least one annular groove formed on an outer surface of the annular body in a circumferential direction; and at least one ring made of a different material and/or shape from that of the annular body and fitted in the annular groove (as can be understood from this disclosure, the ring is removably fitted in the annular groove and removable without disassembling the tire main body), wherein the ring is level with or protrudes from the outer surface of the annular body.

Further, there is provided a drift tire as described in the aspect mentioned above, wherein the annular body is made of a rubber based material, and the ring is made of a synthetic resin based material.

Further, there is provided a drift tire as described in the aspect mentioned above, wherein the annular body is made of a synthetic resin based material, and the ring is made of a rubber based material.

Further, there is provided a drift tire as described in the aspect mentioned above, wherein the annular body is made of a soft rubber based material, and the ring is made of a hard rubber based material.

Further, there is provided a drift tire as described in the aspect mentioned above, wherein the annular body is made of a hard rubber based material, and the ring is made of a soft rubber based material.

Further, there is provided a drift tire as described in the aspect mentioned above, wherein the annular body is made of a rubber based material, and the ring is made of a metal based material.

Further, there is provided a drift tire as described in the aspect mentioned above, wherein the ring is constituted by a proper number of elements made of a synthetic resin based material, a rubber based material or a metal based material, and structured by appropriately combining the elements. The ring can be comprised of multiple rings fitted in one groove. Different rings can be fitted in different grooves.

Further, in accordance with another aspect of the present invention, there is provided a remote control car, wherein the various types of drift tires described above are attached to front wheels and rear wheels or only to the rear wheels. In an embodiment, the drift tires can be attached only to front wheels. In another embodiment, the drift tire can be attached to any one or more of front and rear wheels. Further, in yet another embodiment, the drift tire(s) can be attached to not only four-wheel vehicle but also any other types of vehicles having at least one wheel, such as two-wheel vehicles, three-wheel vehicles, eight-wheel vehicles, 16-wheel vehicles, two-axle vehicles, three axle vehicles, four-axle vehicles, etc. The drift tire can be attached to any one or more of these wheels.

In accordance with at least one embodiment of the present invention, the drift tire can maintain traction with a road surface by the ring and the annular body with respect to the run in the circumferential direction of the tire, even in the case of fitting the ring to the annular groove on the outer surface of the annular body. Further, in the case of steering the tire toward a lateral direction, traction with a road surface is generated mainly by the ring, so that traction can significantly be reduced, whereby it is possible to generate a side slip phenomenon. Accordingly, as well as the normal linear run, it is possible to enjoy the drift run at a corner and the drift run in a narrow space and various places.

Further, in at least one embodiment of the present invention, it is possible to appropriately select an extent of difficulty in changing to the drift run by appropriately selecting the number and the kind of the rings fitted to the outer surface of the tire and the kind of the annular body. Accordingly, when a user recognizes the state of a road surface, the user can freely select the number and the kinds of rings. Thus, it is possible to obtain different results in accordance with the quality of the selection, and the user can better enjoy use of the tires.

Further, in accordance with at least one embodiment of the present invention, the drift tire can be attached to front wheels and rear wheels of a remote control car and the like, or only to the rear wheels, it is possible to easily attach and replace the drift tires, and it is possible to change the drift state of the vehicle.

In the foregoing embodiments, any element used in an embodiment can interchangeably be used in another embodiment, and any combination of elements can be applied in these embodiments, unless it is not feasible.

For purposes of summarizing the invention and the advantages achieved over the related art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

DETAILED DESCRIPTION OF THE PREFERRED EMBODIMENT

A description will be given of a tire applied to a remote control car in accordance with preferred embodiments of the present invention in which a drift run is made liable, on the basis of embodiments. The preferred embodiments do not intend to limit the present invention.

Embodiment 1

Figure 1:
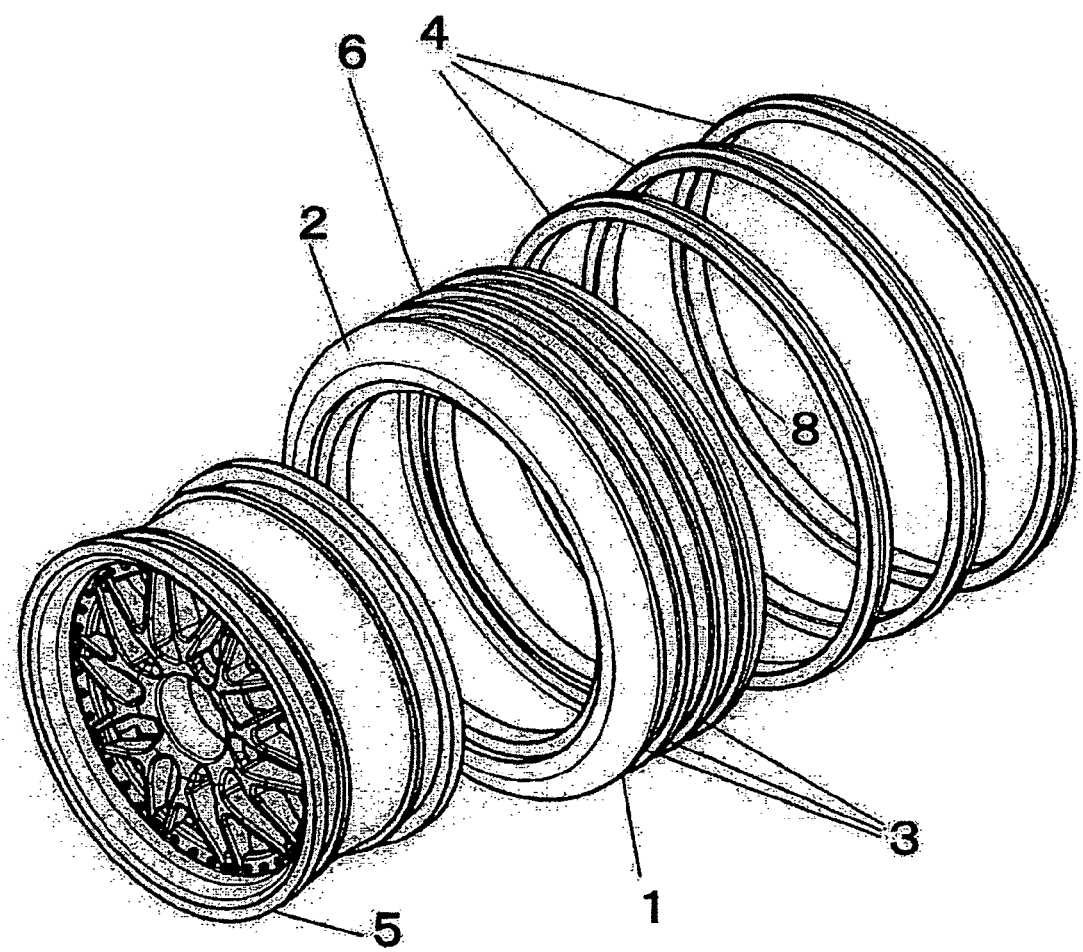
FIG. 1 is an exploded perspective view of a drift tire in accordance with an embodiment of the present invention.
Figure 2:
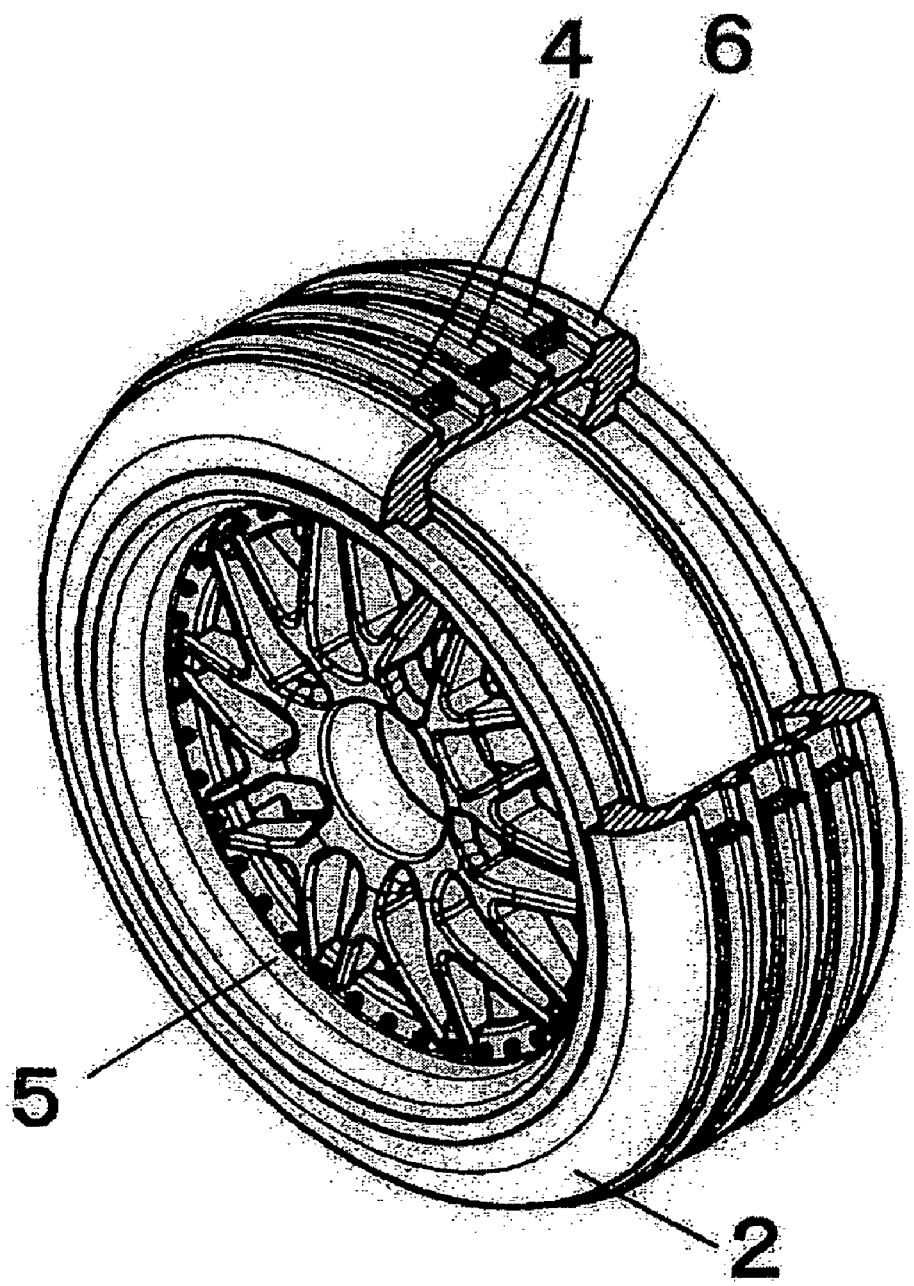
FIG. 2 is a partly notched perspective view after assembling the drift tire in accordance with an embodiment of the present invention.
Figure 3:
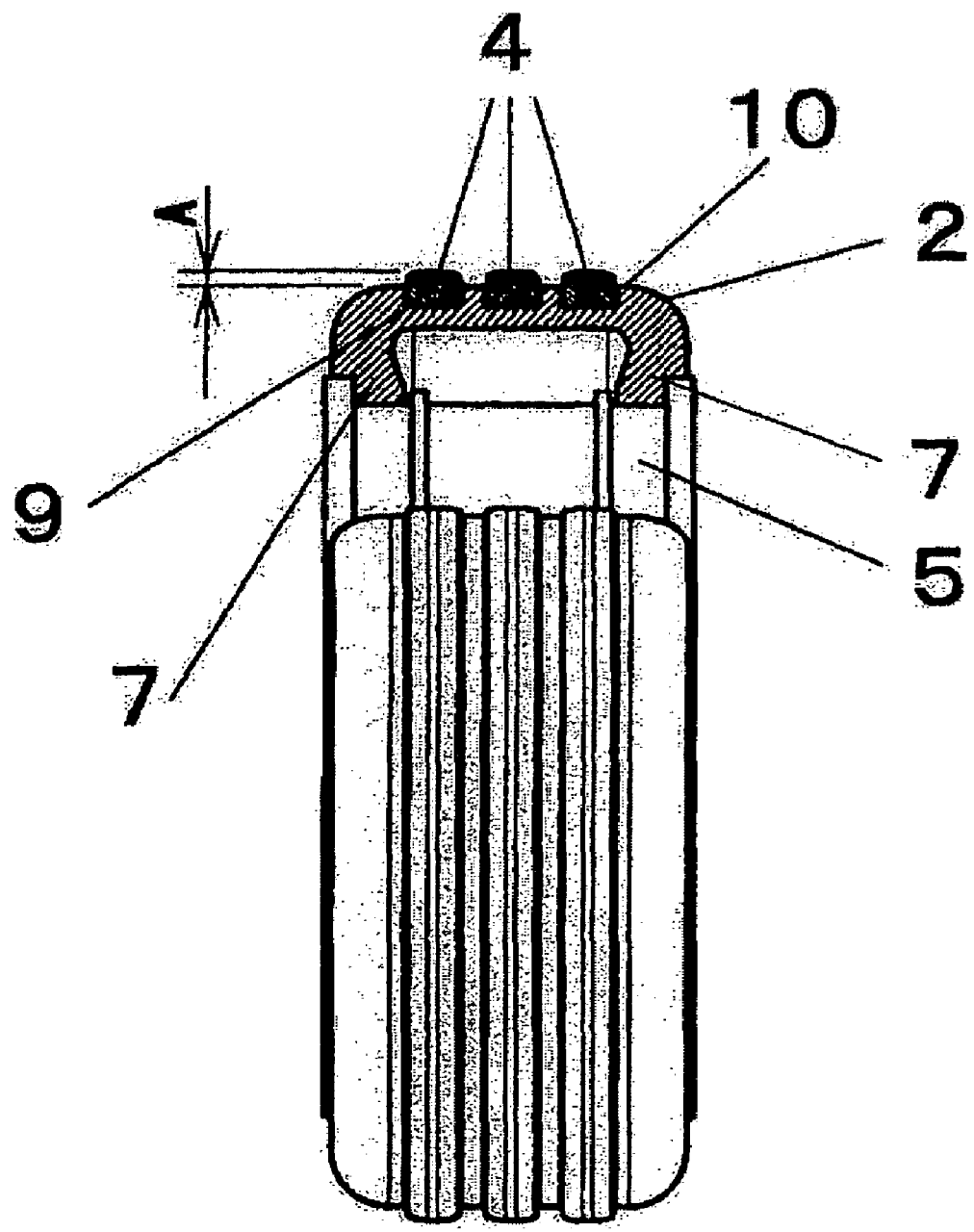
FIG. 3 is a partly cross sectional side elevational view of the drift tire in accordance with an embodiment t of the present invention.

FIG. 1 is a perspective view in which a drift tire in accordance an embodiment of with the present invention is exploded, FIG. 2 is a perspective view of an assembly thereof, and FIG. 3 is a partly cross sectional side elevational view of the drift tire.

Reference numeral 1 denotes a tire main body, reference numeral 2 denotes an annular body forming an outer peripheral surface of the tire main body 1, reference numeral 3 denotes an annular groove formed on an outer surface of the annular body 2, reference numeral 4 denotes a ring to be fitted to the annular groove 3, and reference numeral 5 denotes a wheel.

The annular body 2 is a tubular body made of a rubber based material which is normally used as a material for the tire, and is constituted by an annular outer peripheral body 6, flanges 7 folded to an inner side from both side edge portions of the outer peripheral body 6, and annular grooves 3 formed on an outer surface of the outer peripheral surface 6 in a circumferential direction. The number of the annular grooves 3 is selected on the basis of a width of the tire main body 1, a road surface state, a weight and a size of the remote control car, and the like. In the drawings of the present embodiment 1, there is shown the structure having three annular grooves, however, the number of the annular grooves may be set one or two.

Rings 4 are respectively fitted to the annular grooves 3 mentioned above. A vertical cross section of each of the rings 4 employs a shape in which both end portions in an upper portion are formed in a curved shape, and a lower side is fitted to the annular grooves 3 so as to be prevented from dropping out. A side surface portion is formed in a taper shape so as to improve a fitting force, however, is not limited to this shape. The lower portions of the rings 4 and a circumferential wall 8 forming the side surface portion are fitted to a bottom portion 9 and a side wall 10 of the annular groove 3 so as to be closely attached. A material of the rings 4 employs a synthetic resin based material, a metal based material, or a rubber based material having different hardness or quality from that of the annular body 2. In the case of the rubber based ring, a material having a higher hardness than a material of the annular body 2, or a material in the inverse state is used. A stainless, a steel plate, an alloy mainly containing the stainless or the steel or the like is used in the case of the metal based material.

Further, the outer peripheral surface forming the upper portion of the ring can employ an appropriate structure such as a smooth structure, a structure on which a radial tire pattern is formed, and the like.

In order to fit the rings 4 to the annular grooves 3 the annular body 2 is first fitted to the outer peripheral portion of the wheel, and thereafter, the rings 4 are fitted to the annular grooves 3 mentioned above. Since the ring is formed by a thin member, the ring can be fitted to the annular grooves 3 of the fitted annular body 2. Further, in the case of preparing some rings 4 having different materials and different outer peripheral surface shapes, it is possible to freely select the rings in correspondence to the various vehicle types, the various road surface state, or a game correspondence.

As mentioned above, the rings 4 are fitted to the annular groves 3, however, in the case that the outer surface of the annular body 2 and the outer surface of the rings 4 are the same level, a contact surface of the annular body 2 with the road surface is constituted by the rubber based material surface of the annular body 2 and the outer peripheral surfaces of the rings 4. Accordingly, the grip force of the annular body 2 is applied by both the elements, however, the grip fore can be regulated by the rings 4. For example, it is possible to obtain various grip force states on the basis of a combination of the number and the material of the rings 4. Further, it is accordingly possible to select the difficulty of the drift run.

In the structure shown by a partly cross sectional side elevational view in FIG. 3, the rings 4 are protruded from the surface of the annular body 2. A protruding height A can be appropriately selected, however, about 0.1 mm to about 1.0 mm is suitable. In accordance with the protrusion, the grip force of the annular body 2 with the contact surface is obtained by the sum of the outer peripheral contact surfaces of the rings 4, and it is possible to select the grip force on the basis of the rings 4, whereby it is possible to select the difficulty of the drift run.

In accordance with the structure mentioned above, the grip force of the annular body 2 can be adjusted by the outer peripheral surface of the annular body and/or the contact surface of the rings, and the drift run can be steered by the remote control car using the tire in accordance with the present embodiment 1. For example, in the case of attaching the drift tire to the front wheels and the rear wheels, it is possible to slip the remote control car in a lateral direction by steering the front wheels, whereby the drift run can be achieved. It is possible to structure the drift remote control car by attaching the drift tire only to the rear wheels.

Embodiment 2

An embodiment 2 in accordance with an embodiment of the present invention is structured such that the annular body is formed as a tubular body made of a synthetic resin based material, and a suitable number of annular grooves are formed in a circumferential direction of the surface of the annular body. Rings each being made of a rubber based material are fitted to the annular grooves in a closely attached state.

The ring can be easily fitted to the annular groove by expanding the elastic ring to enlarge its loop.

Embodiment 3

Figure 4:
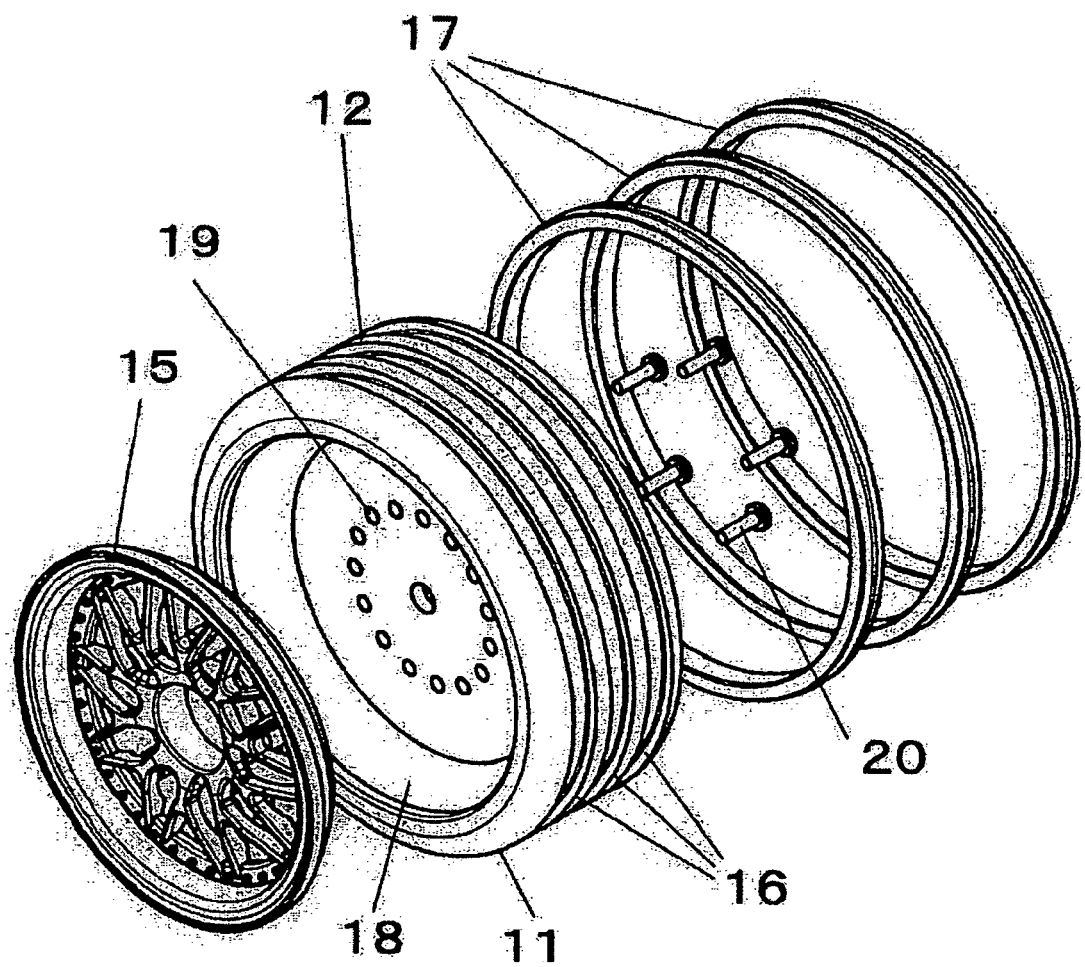
FIG. 4 is an exploded perspective view of another embodiment of the drift tire in accordance with an embodiment of the present invention.
Figure 5:
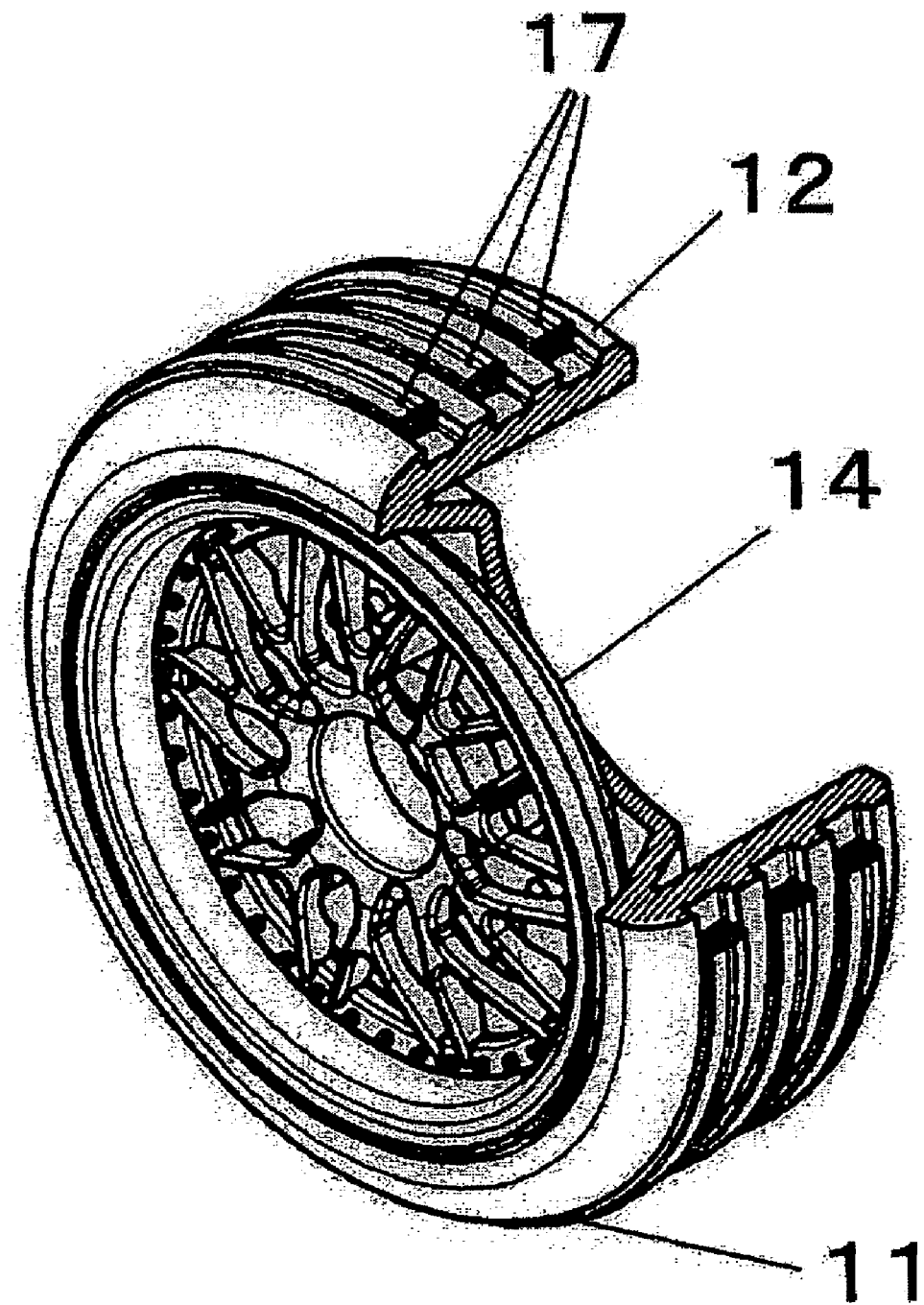
FIG. 5 is a partly notched perspective view after assembling the drift tire in accordance with an embodiment of the present invention.
Figure 6:
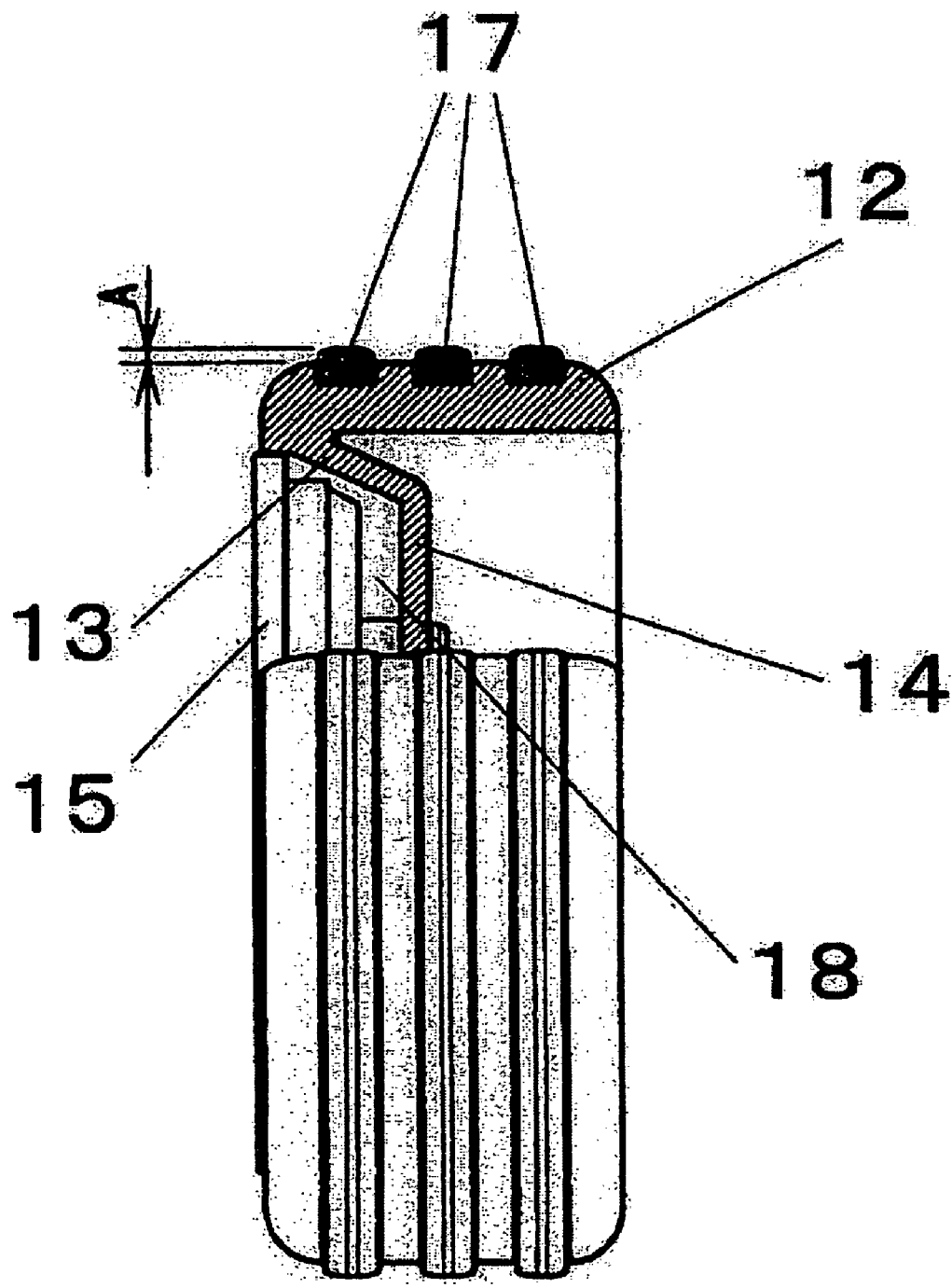
FIG. 6 is a partly cross sectional side elevational view of another embodiment of the drift tire in accordance with an embodiment of the present invention.

FIG. 4 is a perspective view showing an exploded state of the drift tire in accordance with an embodiment of the present invention in the same manner as the embodiments 1 and 2 mentioned above, FIG. 5 is a perspective view of an assembly thereof, and FIG. 6 is a partly cross sectional side elevational view of the same.

The tire main body 11 is made of a synthetic resin based material in the same manner as the embodiment 2 mentioned above, and is constituted by an annular body 12 forming an outer peripheral surface, an inner folded portion 13 of an edge portion of the annular body 12, an inner reinforcing member 14 connected to the inner folded portion 13, a disc 15 in a front surface side of the inner reinforcing member 14, annular grooves 16 formed in a circumferential direction of an outer surface of the annular body 12, and rubber based rings 17 fitted to the annular grooves 16 in a closely attached state.

The annular body 12 forms the inner folded portion 13 by continuously folding to an inner side from an end edge portion of the annular body 12. Further, the inner reinforcing member 14 is continuously formed in a leading end edge side of the inner folded portion 13. A disc 15 side surface portion 18 is formed in the tire main body 11.

The annular body 12, the inner folded portion 13 and the inner reinforcing member 14 can be integrally molded by the synthetic resin based material. Further, it is possible to omit the inner folded portion 13 and the inner reinforcing member 14 and form the annular body 12 and the disc 15 in accordance with an integral molding. Accordingly, it is possible to omit the step of fitting the annular body 2 to the wheel 5 in the case of the embodiment 1.

The disc 15 is arranged in the surface portion 18, however, the disc 15 formed as an independent body can be easily attached and detached by mounting a mounting member 20 to a mounting hole 19 formed in the inner reinforcing member 14 from an opposite side therethrough. Accordingly, it is possible to easily replace the disc 15, whereby it is possible to apply to a change to an outer appearance of the tire.

In general, a replacing work of the wheel portion is generated for replacing the disc. A significant work load is required for the replacement, however, the structure in accordance with the embodiment 3 can be replaced easily and with a low cost.

In this case, the attaching means of the disc 15 can select an appropriate means such as a fitting, an adhering and the like.

Since the annular body is formed by the synthetic resin based material as is different from the annular body formed by the rubber based material in the embodiment 1, the grip force with the road surface is extremely lowered. Accordingly, the tire slip is brought about at a time of running, and this is a satisfactory matter for reproducing the drift state. However, the grip force is too low in the case of the synthetic resin based material, a straight running property and a controllability are extremely deteriorated, and it is necessary to secure the grip force.

Since the rings 17 fitted to the annular grooves 16 are made of the rubber based material, the rings have a function of increasing the grip force, whereby it is possible to improve the straight running property and the controllability mentioned above. It is possible to adjust the grip force step by step by appropriately selecting the mounted number, the width, the surface pattern, the material and the like of the rings 17.

In the rings 17, the contact surface of the rings 17 share the grip force with the contact surface by protruding the rings 17 from the outer surface of the annular body 12 of the tire main body 11, in the same manner as that of the embodiments 1 and 2 mentioned above, and it is possible to increase the effect of the grip on the basis of the friction force with the contact surface applied by the rubber based material. Further, since the annular body 12 is made of the synthetic resin based material, an unnatural and uncomfortable loud sound is generated from the contact surface with the road surface during the running, however, the rubber based ring 17 protruding from the annular body 12 can absorb the contact sound with the road surface and can achieve an effect of making the sound small.

Embodiment 4

Figure 7A:
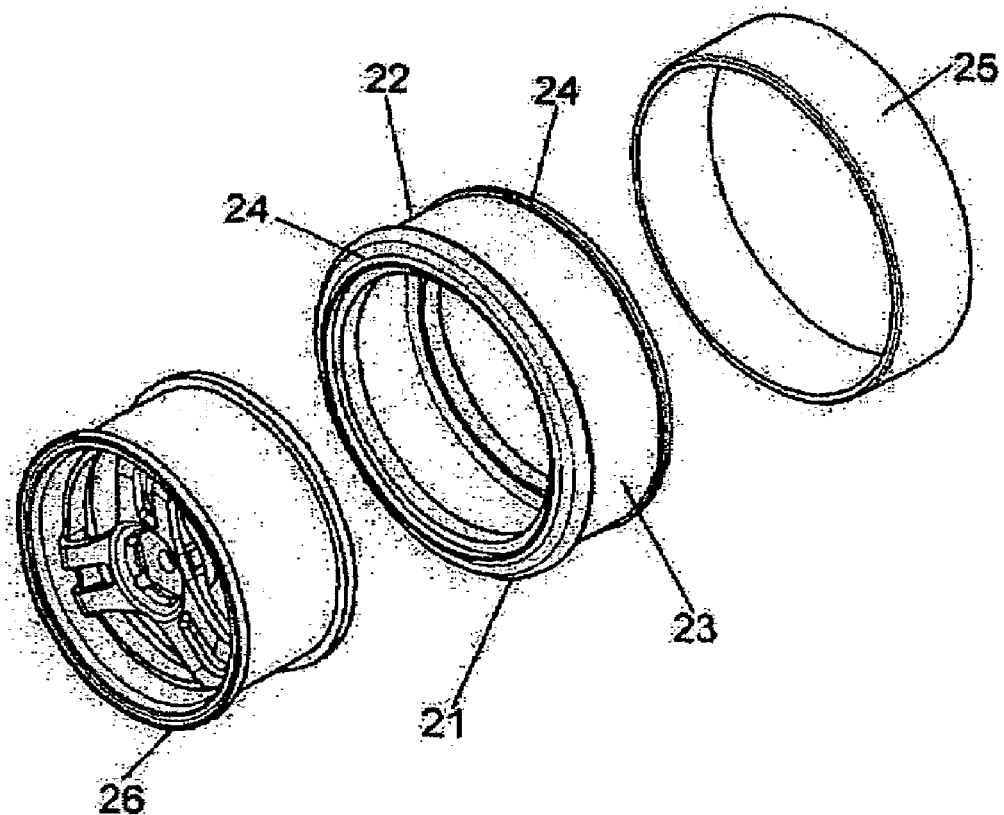
FIG. 7A is an exploded perspective view of the other embodiment of the drift tire in accordance with an embodiment of the present invention.

FIG. 7A is a perspective view of the other embodiment in which a drift tire is exploded.

A tire main body 21 is constituted by an annular body 22 forming an outer peripheral surface of the tire main body 21, an annular groove 23 formed on an outer surface of the annular body 22, annular outer peripheral bodies 24 formed in both end portions of the annular groove 23, a ring 25 to be fitted to the annular groove 23, and a wheel 26.

The annular body 22 employs the same rubber based tubular body as that of the embodiment 1 mentioned above. One wide annular groove 23 is formed between the outer peripheral bodies 24 and 24 of the tire main body 21, and one wide ring 25 having a width between both the outer peripheral bodies 24 and 24 in the present embodiment is formed in the annular groove 23, and is fitted to the annular groove 23.

A material of the ring 25 can employ a synthetic resin based material, a metal based material, or a hard rubber based material.

The ring 25 can be fitted to the annular groove 23 while passing through the outer peripheral body 24 by utilizing an elastic force of the annular body 22 constituted by the rubber based tubular body.

Figure 7B:
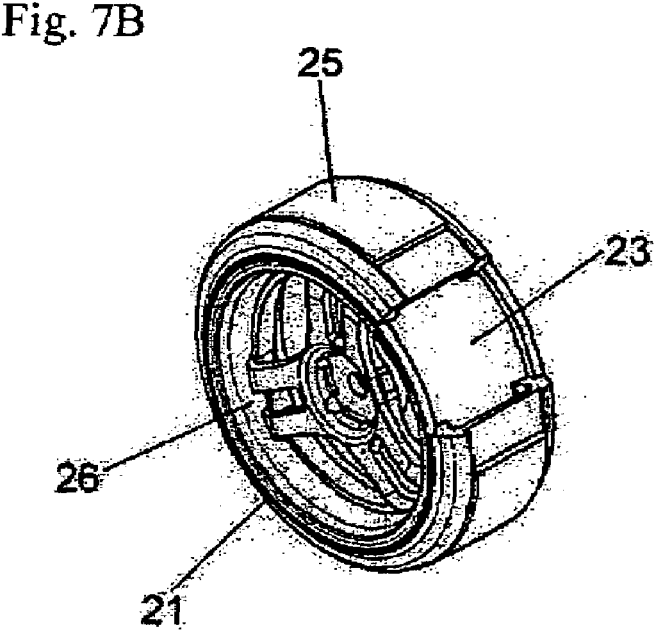
FIG. 7B is a partly notched perspective view after assembling the drift tire mentioned above.

FIG. 7B shows a partly notched perspective view in which the drift tire mentioned above is assembled. The drift tire is assembled such that an outer surface of the attached wide ring 25 is in the same level as outer surfaces of the outer peripheral bodies 24 and 24 or in a protruding state. A remote control car for drifting can be obtained by using the tire main body 21 having the structure mentioned above as a tire wheel of the remote control care having the same structure as that of the embodiment 1.

In the structure in accordance with the present embodiment 4, it is possible to omit a work for fitting the ring 25 to the narrow annular groove in comparison with the embodiments 1 to 3, and it is possible to obtain the tire main body 21 to which the ring 25 can be easily fitted and attached.

Embodiment 5

Figure 8A:
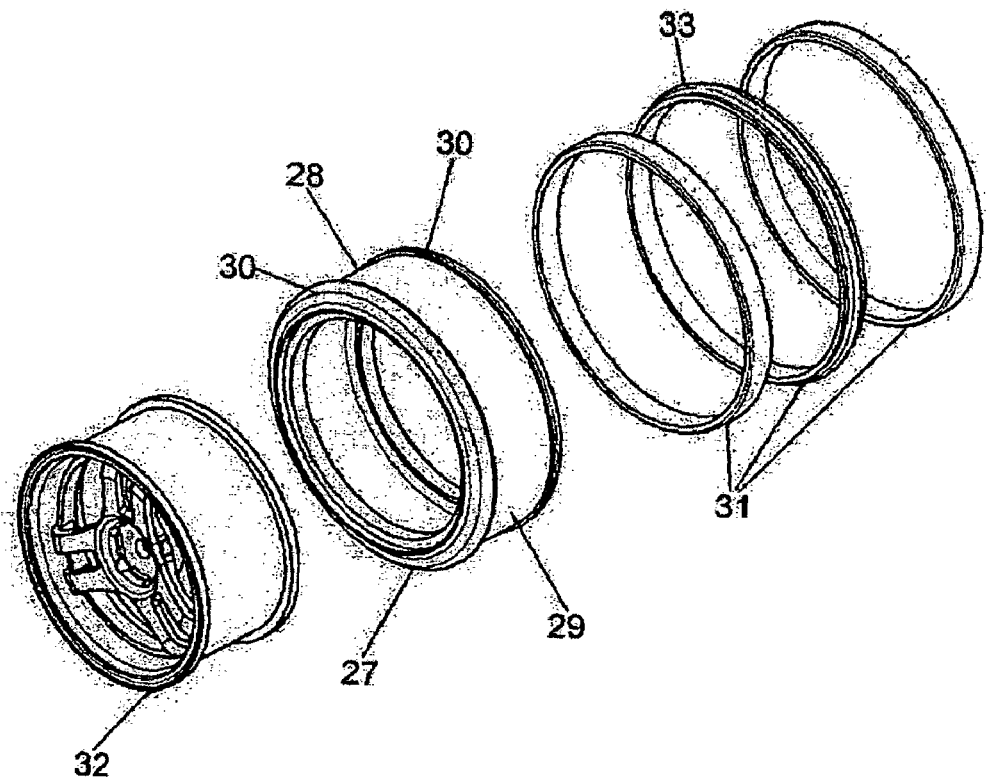
FIG. 8A is an exploded perspective view of the other embodiment of the drift tire in accordance with an embodiment of the present invention.
Figure 8B:
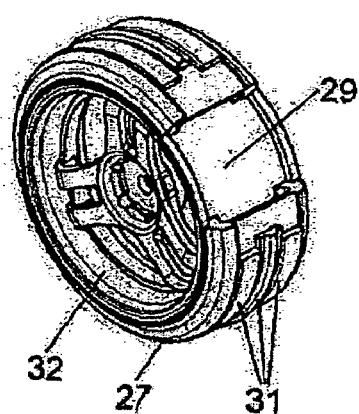
FIG. 8B is a partly notched perspective view after assembling the drift tire mentioned above.

FIG. 8A is a perspective view of the other embodiment in which a drift tire is exploded.

A tire main body 27 is constituted by an annular body 28 forming an outer peripheral surface of the tire main body 27, an annular groove 29 formed on an outer surface of the annular body 28, annular outer peripheral bodies 30 formed in both end portions of the annular groove 29, a ring 31 to be fitted to the annular groove 29, and a wheel 32.

In the same manner as that of the embodiment 4, one wide annular groove 29 is formed between the outer peripheral bodies 30 and 30, and three rings 31 are fitted to the annular groove 29 in parallel in accordance with the present embodiment. The rings 31 are closely attached to each other in respective side surfaces, and both end side surfaces are closely attached to inner side surfaces of the outer peripheral bodies 30 and 30. Accordingly, three rings 31 are integrally fitted.

A material of the rings 31 and 31 shown in FIG. 8A can employ a synthetic resin based material or a metal based material in the rings 31 and 31 positioned in right and left sides, and employ a rubber based material in the ring 31 positioned in a center.

The rings 31 and 31 can be fitted to the annular groove 29 while passing through the outer peripheral body 30 by utilizing an elastic force of the annular body 28 made of the rubber based tubular body.

The right and left rings 31 and 31 are formed with a smooth surface in their outer surfaces, however, the center rubber based ring 31 is formed with an annular projection 33 in which a center portion of an outer surface constitutes a convex portion, thereby preventing a grip force with the ground surface from becoming too large, and adjusting the grip force.

FIG. 8A is a partly notched perspective view in which the drift tire is assembled.

The rings 31, 31 and 31 are assembled such that the outer surfaces of the attached three rings 31, 31 and 31 are in the same level as the outer surfaces of the outer peripheral bodies 30 and 30 or in a protruding state.

A remote control car for drifting can be obtained by using the tire main body 27 having the structure mentioned above as a tire wheel of the remote control car in the same manner as mentioned above.

Embodiment 6

Figure 9:
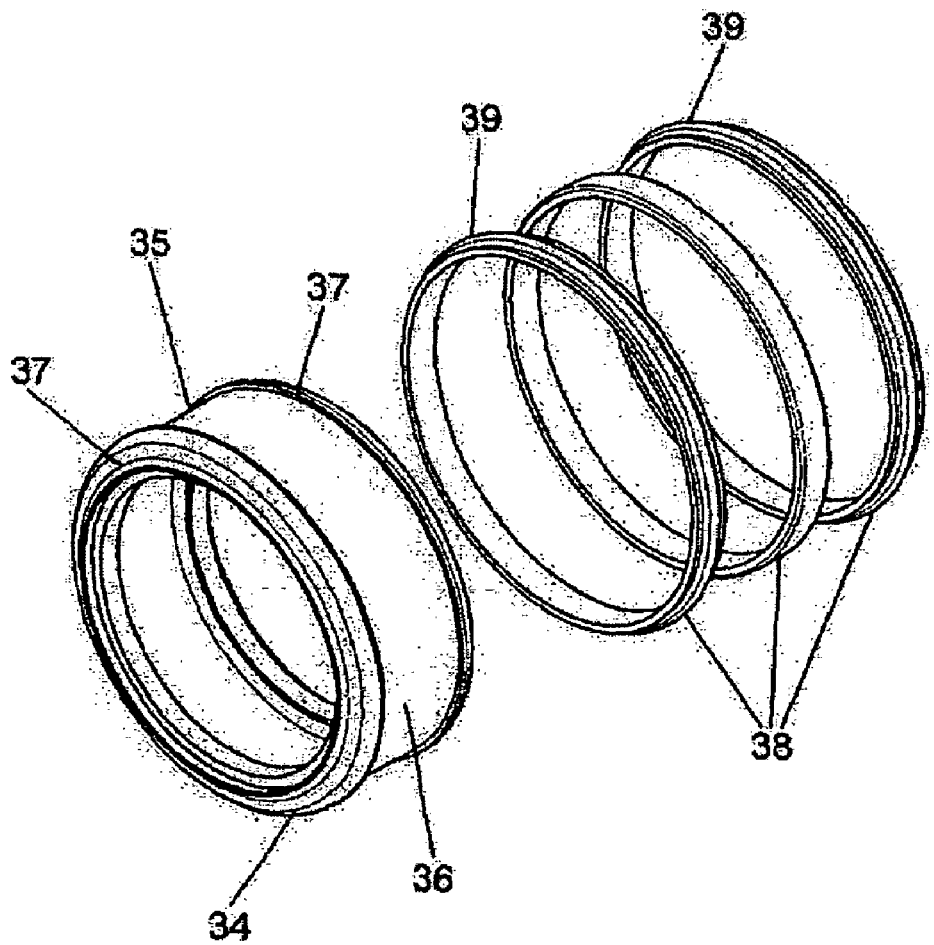
FIG. 9 is an exploded perspective view of the other embodiment of the drift tire in accordance with an embodiment of the present invention.

FIG. 9 is a perspective view of the other embodiment in which the drift tire is exploded. The drift tire is constituted by a tire main body 34, an annular body 35 forming an outer peripheral surface of the tire main body 34, an annular groove 36 formed on an outer surface of the annular body 35, annular outer peripheral bodies 37 formed in both end portions of the annular groove 36, and a ring 38 to be fitted to the annular groove 36, in the same manner as that of the embodiment 5.

In accordance with the present embodiment, three rings 38 are provided, and are fitted to the annular groove 36 while arranging them in line and closely attaching side surfaces to each other. The rings 38 and 38 positioned in right and left sides employ a rubber based material, and the ring 38 positioned in a center employs a synthetic resin based material or a metal based material.

The right and left rings 38 and 38 form an annular projection 39 in which a center portion of the outer surface constitutes a convex portion, and an outer surface of the center ring 38 is formed with a smooth surface. A protruding positional relation between the outer surfaces of the attached three rings 38, 38 and 38 and the outer peripheral bodies 37 and 37 are the same as the embodiment 5 mentioned above. It is possible to obtain the tire main body 34 generating a different drift state from that of the embodiment 5 mentioned above, by attaching a proper number of rings 38, 38 and 38 having the outer surfaces having the different grip forces with the ground surface to the annular groove 36.

Embodiment 7

Figure 10:
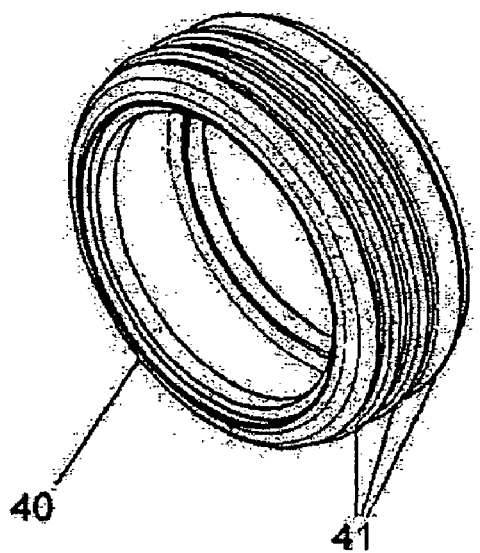
FIG. 10 is a perspective view of the other embodiment after assembling the drift tire in accordance with an embodiment of the present invention.

FIG. 10 is a perspective view of the other embodiment in which a drift tire is assembled. The drift tire is structured, in the same manner as that of the embodiments 5 and 6, such that two rubber based rings 41 and 41 are arranged in line and attached to a wide annular groove of a tire main body 40, and a synthetic resin based or a metal based ring 41 having a smooth out surface is attached to any one of the rings 41 and 41. A protruding positional relation between the outer surfaces of the attached three rings 41, 41 and 41 and both the outer peripheral bodies of the annular groove is the same as the embodiments 5 and 6 mentioned above.

Embodiment 8

Figure 11:
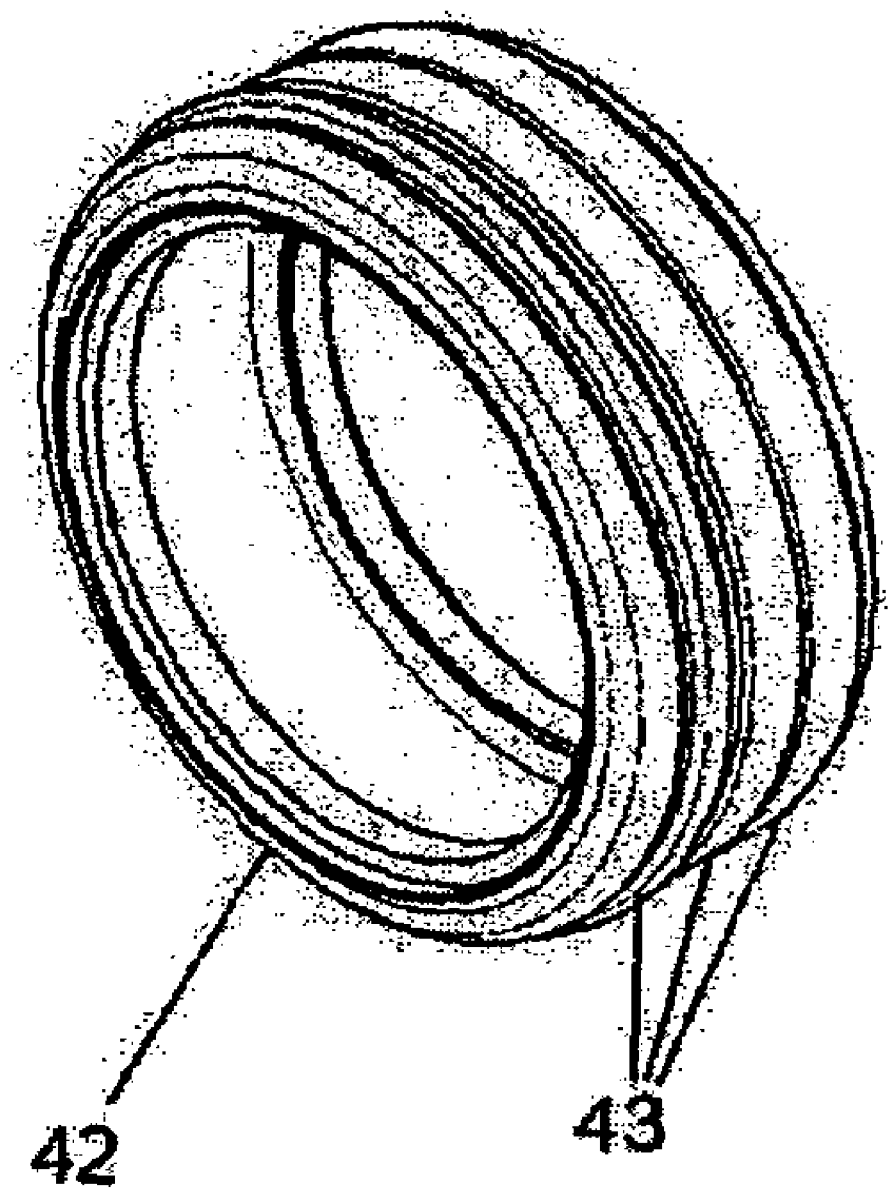
FIG. 11 is a perspective view of the other embodiment after assembling the drift tire in accordance with an embodiment of the present invention.

FIG. 11 is a perspective view of the other embodiment in which a drift tire is assembled. The drift tire is structured such that two rubber based or metal based rings 43 and 43 having smooth outer surfaces are arranged in line and attached to a wide annular groove of a tire main body 42, and a rubber based ring 43 is attached to any one of the rings 43 and 43. A protruding positional relation between the outer surfaces of the attached three rings 43, 43 and 43 and both the outer peripheral bodies of the annular groove is the same as the embodiments 5, 6 and 7 mentioned above.

In the case that the width of the annular groove and the width of one ring are the same in the ring in accordance with the embodiments 6 to 8, a remote control car having a different drift state can be obtained without replacing the entire tire main body only by appropriately replacing the attached positions as occasion demands.

Further, in the embodiments mentioned above, the outer surface of the rubber based ring employs the annular projection in which the center portion is constituted by the convex portion, however, since the convex portion intends to adjust the grip force with the ground surface, it goes without saying that the shape may be formed in a trapezoidal cross sectional shape, or a flat shape having the same or approximately the same width as the inner surface.

Further, the material of the rubber based ring is a concept including a material manufactured by mixing the other materials such as the synthetic resin or the like to the rubber in addition to the material made of only the rubber, and since the material intends to adjust the grip force as mentioned above, a difference is generated in the grip force in correspondence to the soft type or the hard type, so that the user can properly use the material as occasion demands.

Accordingly, the grip force can be adjusted by appropriately combining and using the shape and the material of the ring, and it is possible to obtain the remote control car for drifting which can obtain the various different drift states, by using the drift tire to which the selected ring is attached as the tire wheel of the remote control car.

The present invention is not limited to the foregoing embodiments. That is, the number of ring(s) fitted to an annular body can be 1-10 including 2, 3, 4, 5, and 6. The number of groove(s) formed on an outer surface of an annular body can be 1-10 including 2, 3, 4, 5, and 6. The number of rings fitted in one groove can be 1-10 including 2, 3, 4, 5, and 6, depending on the width of the groove. When multiple rings are fitted to an annular body (especially when multiple rings are fitted in one groove), respective rings may have different outer diameters, shapes, and/or widths, and/or may be made of different materials. The total width of groove(s) can be about 10% to about 95% (including 20%, 30%, 40%, 50%, 60%, 70%, 80%, 90% and ranges between any two numbers of the foregoing) of the width of the outer surface of an annular body. At least one ring may have an outer diameter greater than that of an annular body by about 0.1 mm to about 2.0 mm (including 0.2 mm, 0.5 mm, 1.0 mm, 1.5 mm, and ranges between any two numbers of the foregoing) or by about 0.1% to about 2% (including 0.2%, 0.5%, 1%, 1.5%, and ranges between any two numbers) of the outer diameter of the annular body. The outer diameter of an annular body may be about 1 cm to about 50 cm including 5 cm, 10 cm, 20 cm, 30 cm, and ranges between any two numbers of the foregoing.

The present application claims priority under 35 U.S.C. § 119 to Japanese Patent Applications No. 2003-351928 filed Oct. 10, 2003 and No. 2004-201452 filed Jul. 8, 2004, the disclosure of which is incorporated herein by reference in their entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A tire comprising:
a tire main body having an annular body adapted to be fitted to a wheel and an annular groove formed on an outer surface of the annular body in a circumferential direction; and
a ring made of a material different from that of the annular body, said ring having a thickness equal to or thicker than a depth of said annular groove, said ring being removably attached to said annular groove and being removable without disassembling the tire main body,
wherein the annular body is made of a soft rubber based material, and the ring consists of a hard rubber based material,
wherein said ring has a thickness thicker than the depth of said annular groove by about 0.1 to 1.0 mm and is configured to reduce traction of the tire with a road surface.

2. The tire as claimed in claim 1, wherein said tire main body has a plurality of annular grooves as said annular groove on the outer surface.

3. The tire as claimed in claim 2, which comprises as said ring the same number of rings as that of said annular grooves, each ring being fitted to each corresponding annular groove.

4. The tire as claimed in claim 1, which comprises a plurality of rings as said ring, wherein the total width of rings is substantially the same as the width of said annular groove.

5. A remote control car which comprises front wheels and rear wheels, wherein the tire as claimed in claim 1 is attached to at least one of said front wheels and said rear wheels.

* * * * *